United States Patent [19]
Tadao

[11] 3,765,767
[45] Oct. 16, 1973

[54] FOCUS ADJUSTING DEVICE FOR CAMERA OR CINE CAMERA

[75] Inventor: Isono Tadao, Tokyo-to, Japan

[73] Assignee: Bell & Howell Japan, Ltd., Tokyo-to, Japan

[22] Filed: Mar. 27, 1972

[21] Appl. No.: 238,072

[52] U.S. Cl. ................. 356/8, 88/1.5 R, 95/11 V, 95/44 C
[51] Int. Cl. ......................................... G03b 13/20
[58] Field of Search ..................... 95/44 C, 11 V; 356/8; 88/1.5 R

[56] References Cited
UNITED STATES PATENTS

| | | |
|---|---|---|
| 2,397,160 | 3/1946 | Schwartz et al..................... 95/44 C |
| 1,163,594 | 12/1915 | Fry.......................................... 356/8 |
| 1,299,030 | 4/1919 | Reynolds............................... 356/8 |
| 1,568,759 | 1/1926 | Magin et al............................ 356/8 |
| 3,538,830 | 11/1970 | Henriksen et al................... 95/44 C |
| 3,538,831 | 11/1970 | Mueller................................. 95/44 C |

Primary Examiner—David Schonberg
Assistant Examiner—F. L. Evans
Attorney—John E. Peele, Jr.

[57] ABSTRACT

To enable focusing the objective lens of an optical instrument or camera on a remote subject, a mechanism based on the principle of triangulation is provided having a gravity responsive pendulous member actuating a light control relative to a light source which is movable in response to adjustment of the focus of the objective lens. By a light conducting system, the light controlled by relative positions of the pendulous member and the light are coordinated to be visible in the viewfinder whereby the user can determine when the lens is adjusted on the subject.

11 Claims, 9 Drawing Figures

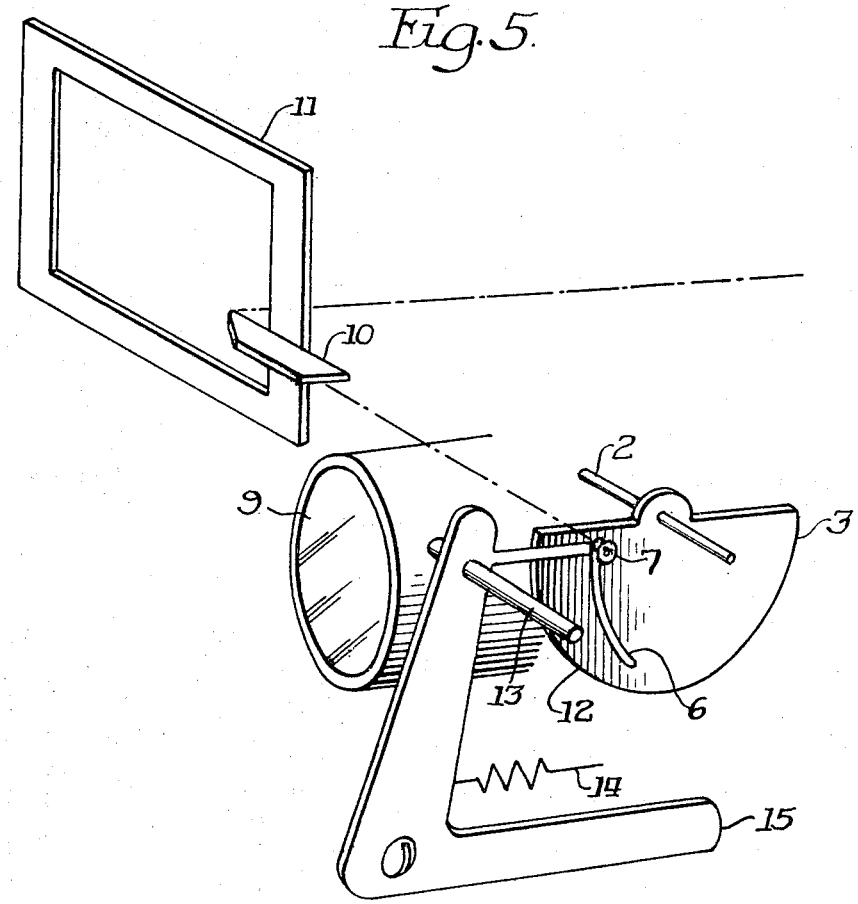
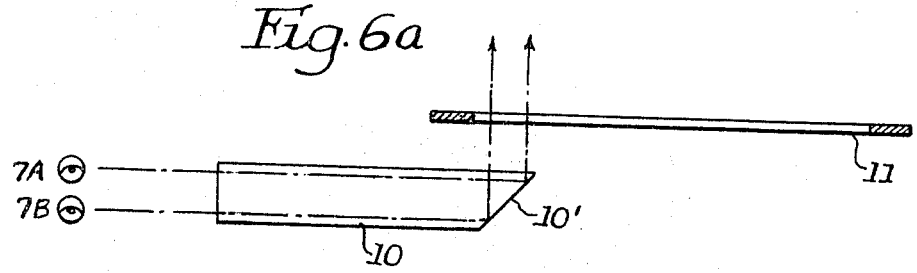
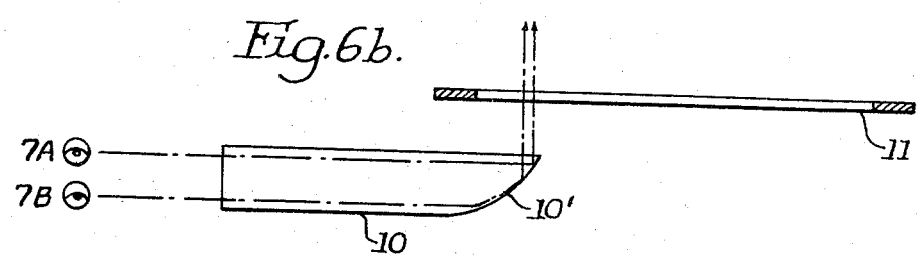

FOCUS ADJUSTING DEVICE FOR CAMERA OR CINE CAMERA

The present application relates to an improvement in a focusing mechanism for an optical instrument, such as a camera, having an objective lens which is adjustable according to focal distances which are determined by the principle of triangulation. Particularly, the invention relates to an improvement in focus adjusting devices using the triangulation principle.

At present, many kinds of focus adjusting devices are used in photographic instruments such as still and motion picture cameras. A system gaining increased acceptance is based on the triangulation principle. The triangulation principle relates to the determination of the length of one side of a right triangle referred to as the camera-to-subject or focal distance. To compute this distance, either the height of the vertical side or the length of the hypotenuse of the triangle, and one of the angles other than the right angle must be known. For use of the principle in a camera focusing arrangement, the length of the vertical side of the triangle may be empirically determined as the eye level height of an average standing adult above a subject supporting plane. Thus, the vertical side will be approximately the same in most uses to which a camera is put. To determine one of the variable angles of the triangle, the user can view the subject at a point where a vertical line through the subject intersects the supporting plane. Since the varying angular relation may be used to determine the length of the base line, this information may be converted mechanically into focal distance for adjustment of the focus of the objective lens for that distance.

The present invention provides a triangulation range determining system enabling semi-automatic focus adjustment of the objective lens of a camera, preferably while viewing the scene through the viewfinder. A pendulous member is arranged for swinging movement relative to the housing of a camera having an objective lens assembly arranged for focusing adjustment relative to a film plane in the housing. Upon aligning of the optical axis defined by the objective lens on the base of a remote subject, the pendulous member assumes a position responsive to gravity.

By relative positioning of a light source and a light control oriented by a gravity responsive member to control light from the source to the view finder, the user can visually determine the lens focus is attained without removing his eye from the viewfinder. The gravity responsive or pendulous member includes a plate portion having a light control portion such as a curved slot formed therein relative to which a lamp is adjustable as the lens is focused. A carrier couples the lamp and the lens focusing cell of the objective lens to move the lamp in response to focusing of the lens. The condition of focus is indicated when the user sees either a bright indication in the viewfinder or a minimum brightness caused by alignment of the lamp with the light control portion. Further, the control portion of the pendulous member may be coordinated with a cam surface on the pendulous member for positioning of the lens in response to orientation of the pendulous member responsive to angular positioning of the optical axis of the camera relative to the base of a remote subject.

Thus, an object of the present invention is to provide a novel and improved range determining mechanism for use in a camera having a focusable objective lens.

Another object is to provide a distance determining mechanism functional on the triangulation principle for enabling adjusting of the objective lens into a focused condition while viewing the scene through the viewfinder.

Further and other objects will become apparent from the description of the accompanying drawings in which like numerals refer to like parts.

Figure 4:
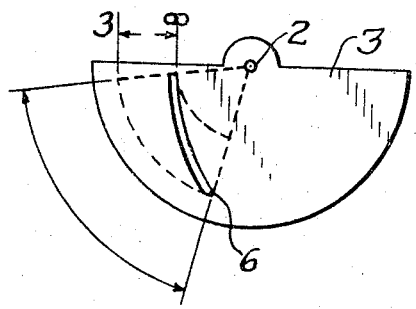
Figure 7:
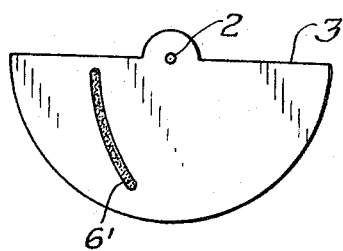

FIGS. 4 and 7 disclose embodiments of the pendulous member according to the invention;

FIG. 5 discloses another embodiment of the components of the system according to this invention; and FIGS. 6a and 6b disclose embodiments of light conducting systems for transmitting light rays from a source to the viewfinder of the camera.

Figure 1:
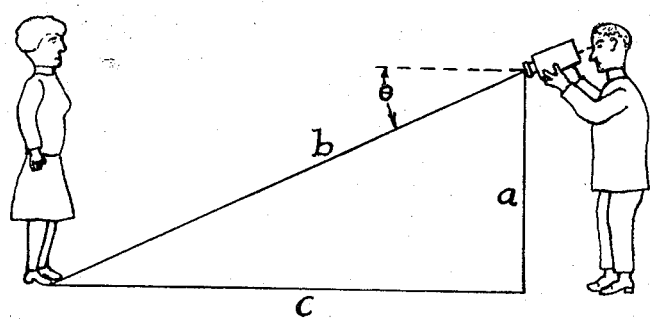
FIG. 1 is a schematic view of the principle of triangulation with a camera in focus determining orientation.

Referring to FIG. 1, the principle of trigonometry as applied to triangulation distance determining systems is shown. The three sides of the right triangle are described as $a$, the height of the camera above the base $c$ on which the operator and the subject are supported, and $b$, the optical axis of the camera and the length of the hypotenuse of the triangle corresponding to the distance from the camera to the base of the subject. The angle $\theta$ represents the angle of inclination of the optical axis of the camera from a horizontal orientation. As the angle of inclination of the hypotenuse relative to the base of the subject varies, the angle $\theta$ varies correspondingly. That is, when the subject is near the camera, the angle is large; and when the subject is more remote, the angle is small. Therefore, the distance can be measured by the function of the angle which relates to the distance $c$ between the camera and the subject as shown in the different positions of the pendulous member in FIGS. 2a and 2b.

Figure 2A:
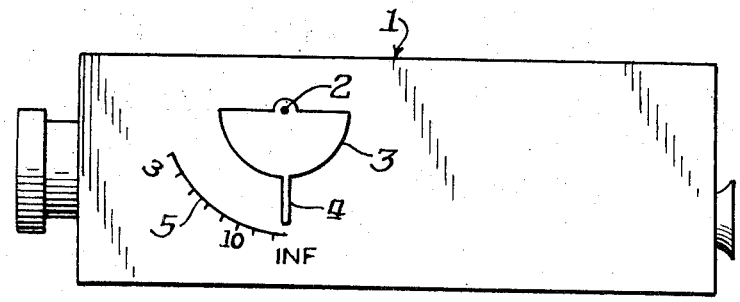
FIGS. 2a and 2b are elevational schematic views of a camera respectively in an orientation for determining a distance corresponding to infinity and a finite distance.
Figure 2B:
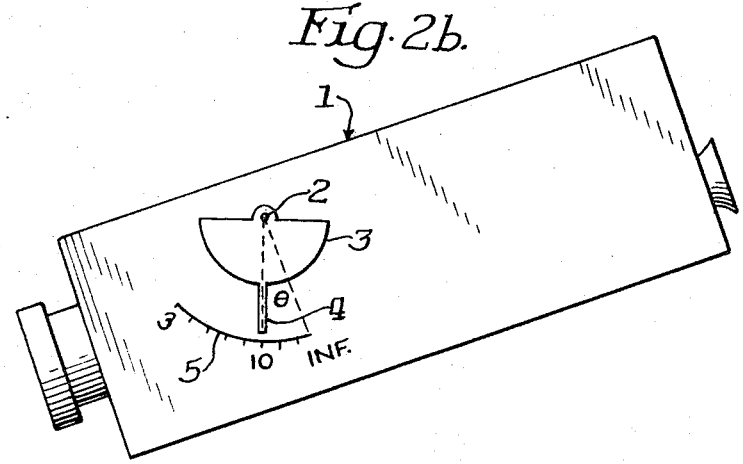

As shown in FIG. 2a, pendulous member 3 swings freely about a pivot 2 in a camera 1. An indicator member 4 is arranged on the pendulous member 3 to indicate the distance as represented on the scale 5 which corresponds to the value of the distance converted from the function of the angle $\theta$. Assuming the distance to be a finite distance, such as 10 feet as shown in FIG. 2b, when the camera is directed at the base of the subject to determine the plane to be focused on, the pendulous member 3 is adjusted relative to the camera. (Although the camera is tilted and the pendulous member remains substantially stationary in space, the angle $\theta$ is referred to as the swinging angle of the camera. Thus, indicator 4 is aligned with a finite value on the scale 5 which in FIG. 2b corresponds to a distance of 10 feet.

Figure 3:
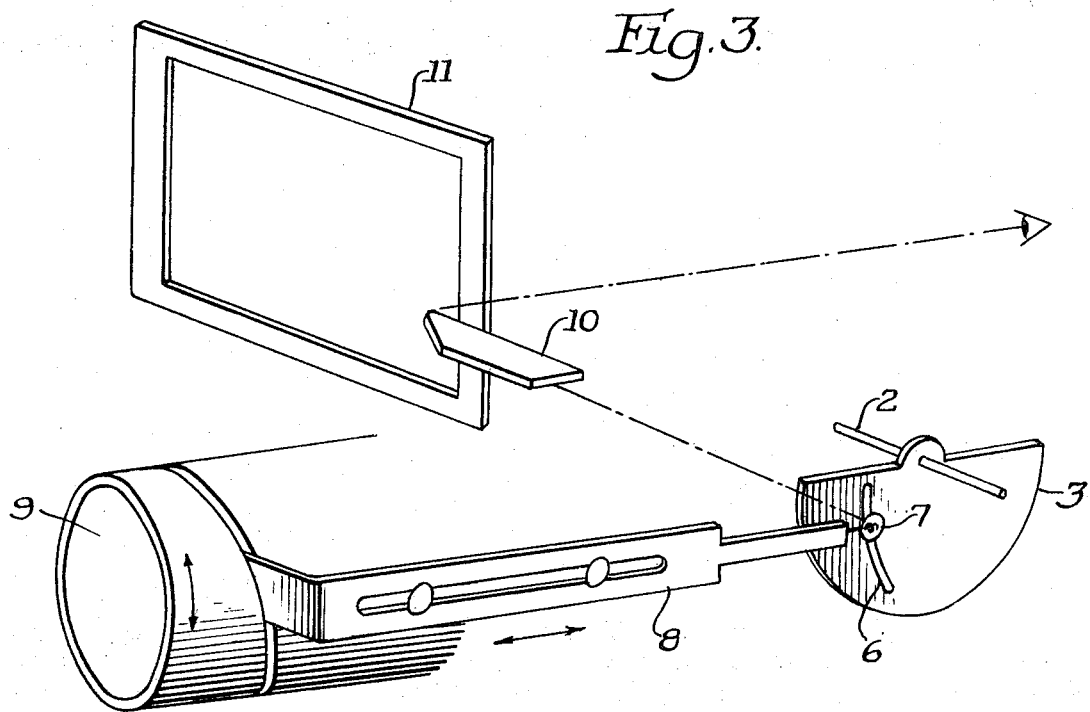
FIG. 3 is a perspective view of an example of operative components of a preferred embodiment according to the invention.

As shown in FIG. 3, the pendulous member 3 includes a plate portion preferably formed of an opaque material through which a light controlling curved slot 6 is formed. The pendulous member is mounted for pivotal movement about a pivot pin 2 on or in the camera housing (not shown). An adjustable arm 8 is coupled to the objective lens 9 for movement in response to changes in the focus of the lens. The arm 8 carries a light source or lamp 7 which is movable along one side of the pendulous member into and out of alignment with the slot 6. Along the opposite side of the pendulous member, a light conducting system, shown as a light conducting rod 10, is arranged to receive light rays from the lamp 7 when the lamp is aligned with the slot 6. Light rays impinging on an end of the light conducting rod or light pipe are directed to the viewfinder 11 into which the other end of the light pipe intrudes.

As seen in FIG. 4, the curve of the slot 6 on the pendulous member plate portion is arranged to correspond with the function of angle $\theta$ as above described. The curve is arranged to gradually approach the pivot pin 2 as the curve extends from the lower part of the plate portion to the upper part thereof. The difference between the radii of the circles on which the respective maximum points of the curve are arranged corresponds to the axial displacement of the lamp 7 as the lens is adjusted between maximum and minimum focus, for example, between three feet and infinity. The pendulous member is arranged to swing through an angle corresponding to the angle between the line connected by the pivot 2 and the highest point of the curved slot and the line connected by the pivot 2 and the lowest point of the curved slot. Therefore, as the pendulous member rotates, the slot controls light from the lamp to the viewfinder by effectively permitting direct rays from the light source to pass to the light conducting member only when the light source and the portion of the control slot are aligned.

Having described the primary components of the system, the focusing operation for an optical instrument incorporating the present invention will be explained. To focus the objective lens, the camera is oriented to align the optical axis of the objective lens with the base of a subject. By a lamp control circuit (not shown) the lamp 7 is energized. Responsive to the orientation of the camera, relative rotational movement of the pendulous member causes the slot 6 to be positioned at an orientation intersecting the adjacent end of the light pipe 10 such that light rays from the lamp pass through the light pipe only when the lamp is aligned therewith. While the camer is angled, the objective lens is adjusted in the direction required to axially align the lamp with the slot. When aligned, the viewfinder end of the light pipe appears to the user at maximum brightness, thereby indicating that an in-focus condition of the objective lens has been achieved. Thereafter, the lamp energizing circuit is de-energized and the camera is used in a normal manner.

In FIG. 7 is shown a modified plate portion of pendulous member 3 formed of transparent or translucent material and having a more dense or opaque curve either printed thereon or otherwise applied thereto. Focus of the lens is determined when light from an energized lamp is reduced to a minimum by aligning the relatively opaque curve with the light pipe. Alternatively, the plate and the curve may be of selected colored materials, for example red and blue, whereby the user can determine focus according to the purity of the color as seen in the light conducting member.

Another embodiment of a distance determining mechanism according to this invention is shown in FIG. 5. In this embodiment, the pendulous member 3 is pivoted with a curved slot 6 and a correspondong cam surface 12 formed along an edge of the member. The cam track 12 is provided to control the axial displacement of the objective lens to cause focusing of the lens on a subject at a distance determined in response to orientation of the pendulous member. As shown, a cam follower pin 13 is fixed to the barrel of a focusing lens cell (not shown) of the objective lens 9. An arm of a bell crank member 15 pivoted about a stud shown at 13', carries the pin 13 and causes the pin to engage the cam surface 12 when the crank member is biased under the influence of spring 14. For operation, the free arm of the crank member is arranged to extend externally of the camera housing whereby the crank member may be manually actuated. As arranged in the shown embodiment, after the camera is angled toward the base of the subject, the crank member may be pressed to displace the lens to an end of its focus range and to release the pendulous member for movement in response to gravity. Actuation of the crank member arm may further energize the lamp 7 carried thereby. Upon release of the crank member while the camera is in focus determining orientation, the spring 14 urges the lens focusing barrel into engagement with the cam surface of the pendulous member. Further, the lamp on the crank member is aligned with the curved light control slot 6 to indicate to the user by illumination of the light conductor member 10 that focus of the lens has been achieved.

FIGS. 6a and 6b show variations of a light conductor 10 having an end width in the direction of lens translation as wide as or wider than the length of travel of the lens focusing cell. If the surface 10' of the light pipe is a flat light ray reflecting surface as shown in FIG. 6a, the light ray is reflected at a different point on the reflecting surface. Hence, a specific point on light pipe 10 is not always illuminated as the incident position differs as the lamp is traversed between positions A and B as the lens is focused on the remote subject. Further, as shown in FIG. 6b, if the reflecting surface 10' of light pipe 10 is curved, the focus adjustment can be more easily accomplished as light is reflected to an almost specific point to the viewfinder end of the light pipe.

It is to be understood that the embodiments shown are illustrative of the principle of operation of a focusing mechanism for cameras, and that changes, alterations, and modifications can be made in the mechanism without departing from the scope of the invention.

What is claimed is:

1. A distance determining mechanism using the principle of triangulation adapted for use in an instrument having a housing, an objective lens focusable on a remote subject and defining an optical axis orientable about a predetermined axis to an angle defining the hypotenuse of a triangle related to the base of the subject, a viewfinder, and a member supported in said housing for adjustment under the influence of gravity when said optical axis is aimed at the base of the subject, the mechanism being characterized by:

light source means for generating illumination displayable in the viewfinder of said instrument;

light control means arranged intermediate said light source means and said viewfinder for controlling the display of illumination in said viewfinder;

first means for positioning one of said light source means and said light control means by said gravity orientable member for movement in response to angular orientation of said optical axis; and second means for positioning the other of said light source means and said light control means in response to adjustment of focus of said objective lens to coordinate said light source means and said light control means to control light displayed in said viewfinder to indicate focus of said objective lens at a distance determined by orientation of said gravity orientable member.

2. The mechanism as claimed in claim 1 wherein said light control means is positionable by said gravity orientable member.

3. The mechanism as claimed in claim 1 wherein said light source means includes light source carrying means adjustable in response to adjustment of focus of said objective lens.

4. The mechanism as claimed in claim 1 wherein a light conducting means is positioned between said light control means and said viewfinder.

5. The mechanism as claimed in claim 2 characterized in that said light control means is a curved slot in said gravity orientable member.

6. The mechanism as claimed in claim 5 characterized in that ends of said curved slot are relatively displaced radially of said gravity orientable member by a distance corresponding to the distance of displacement of said objective lens upon adjusting focus across the focusing range of said lens.

7. The mechanism as claimed in claim 5 characterized in that said gravity orientable member carries a cam surface cooperating with a lens focusing member.

8. The mechanism as claimed in claim 5 characterized in that an end of said light conducting member extends along said light control means a distance corresponding to displacement of said ends of said curved slot.

9. The mechanism as claimed in claim 3 characterized in that said light source means is axially adjustable by a distance corresponding to the distance of displacement of a focusing portion of said objective lens upon adjusting focus across the focusing range of said lens.

10. The mechanism as claimed in claim 4 characterized in that said light conducting member is a light conducting rod having an end portion internal of said viewfinder.

11. A distance determining mechanism using the principle of triangulation adapted for use in an instrument having a housing, an objective lens focusable on a remote subject and defining an optical axis orientable about a predetermined axis to an angle defining the hypotenuse of a triangle related to the base of the subject, a viewfinder, and a member supported in said housing for adjustment under the influence of gravity when said optical axis is aimed at the base of the subject, the mechanism comprising:

a light source adjustably positionable within said instrument housing;

a light control adjustably positionable adjacent said light source;

coupling means for interconnecting one of said light source and said light control to said objective lens for adjustment in response to adjustment of focus of said objective lens; and said other of said light source and said light control being adjustable responsive to movement of gravity orientable member in response to angular orientation of said optical axis whereby said light source and said light control are relatively adjustable into coordinated positions relative to said viewfinder to indicate focus of said objective lens at a distance determined by orientation of said gravity orientable member.

* * * * *